US005649297A

United States Patent [19]

Park

[11] Patent Number: 5,649,297

[45] Date of Patent: Jul. 15, 1997

[54] TRANSMITTING DIGITAL DATA USING MULTIPLE SUBCARRIERS

[75] Inventor: Daniel J. Park, Portland, Oreg.

[73] Assignee: Seiko Communications Holding N.V., Netherlands Antilles

[21] Appl. No.: 327,256

[22] Filed: Oct. 21, 1994

[51] Int. Cl.[6] ..................... H04Q 07/08

[52] U.S. Cl. ..................... 455/45; 455/38.1; 340/825.44; 370/314; 370/330

[58] Field of Search ..................... 455/45, 47, 38.1, 455/38.2, 60, 70, 102, 205.7, 228; 340/825.44; 370/94.1, 69.1, 73, 313, 314, 330, 337, 442, 436

[56] References Cited

U.S. PATENT DOCUMENTS

| | | | |
|---|---|---|---|
| 4,713,808 | 12/1987 | Gaskill et al. | 370/94.1 |
| 4,875,038 | 10/1989 | Siwiak et al. | 340/825 |
| 4,882,579 | 11/1989 | Siwiak | 340/825 |
| 4,891,637 | 1/1990 | Siwiak et al. | 340/825 |
| 4,897,835 | 1/1990 | Gaskill et al. | 370/94.1 |
| 4,928,096 | 5/1990 | Leonardo et al. | 340/825 |
| 4,940,963 | 7/1990 | Gutman et al. | 340/313 |
| 4,951,044 | 8/1990 | Nelson et al. | 340/825 |
| 5,070,329 | 12/1991 | Jasinaki | 340/825 |
| 5,117,460 | 5/1992 | Berry et al. | 381/41 |
| 5,124,697 | 6/1992 | Moore | 340/825 |
| 5,142,279 | 8/1992 | Jasinski et al. | 340/825 |
| 5,142,692 | 8/1992 | Owen | 455/48 |
| 5,148,469 | 9/1992 | Price | 379/57 |
| 5,150,110 | 9/1992 | Breeden | 340/825 |
| 5,153,582 | 10/1992 | Davis | 340/825 |
| 5,155,479 | 10/1992 | Ragan | 340/825 |
| 5,159,331 | 10/1992 | Park et al. | 340/825 |
| 5,162,790 | 11/1992 | Jasinski | 340/825 |
| 5,166,932 | 11/1992 | Hoff et al. | 370/95.1 |
| 5,170,487 | 12/1992 | Peek | 455/45 |
| 5,185,604 | 2/1993 | Nepple, et al. | 340/825.44 |
| 5,187,470 | 2/1993 | King et al. | 340/825.44 |
| 5,189,413 | 2/1993 | Gaskill et al. | 340/825.44 |
| 5,214,787 | 5/1993 | Karkota, Jr. | 455/45 |
| 5,220,366 | 6/1993 | King | 354/76 |
| 5,260,700 | 11/1993 | Merchant et al. | 340/825.44 |
| 5,311,516 | 5/1994 | Kuznicki et al. | 370/94.1 |
| 5,428,610 | 6/1995 | Davis | 455/45 |

*Primary Examiner*—Reinhard J. Eisenzopf
*Assistant Examiner*—Philip J. Sobutka
*Attorney, Agent, or Firm*—Elmer Galbi

[57] ABSTRACT

Two separate subcarriers are used to transmit portions of a single message to one or more receivers on an FM radio signal. The synchronization and addressing data necessary to identify the message to a target receiver is located in the first subcarrier. The second subcarrier, in turn, consists almost entirely of raw message data. Thus, transmitting multiple subcarriers substantially increases the overall data transmission payload when transmitting digital messages. Because each subcarrier is located within a different frequency band, the communication system is also adaptable to different subcarrier allotments in the FM baseband.

19 Claims, 5 Drawing Sheets

TRANSMITTING DIGITAL DATA USING MULTIPLE SUBCARRIERS

BACKGROUND OF THE INVENTION

This invention relates generally to wireless data transmission and more particularly a system for increasing transmission capacity by using multiple subcarriers on FM broadcast radio stations.

It is well known that information can be transmitted by means of a subcarrier contained on FM broadcast radio waves. FIG. 1 shows spectral components of FM signals used in transmissions of both analog radio station broadcasts and digital paging messages. Most FM broadcast radio stations only use the baseband frequencies from 50 hertz (Hz) to 53 kilohertz (kHz) to transmit stereo program material.

In such systems, a first component 12 transmits left plus right channel audio material. A component 14 then transmits left minus right channel audio material. A stereo tone signal 18 is also transmitted at 19 kHz. A mono-channel receiver processes the analog signal from component 12. Alternatively, a dual channel stereo receiver processes both component 12 and component 14. In some geographical locations the FM baseband also includes additional subcarriers.

The remaining baseband frequencies from 53 kHz up to the legal maximum are typically available for the transmission of other data. In the United States, information can be transmitted at frequencies up to 100 kHz. In other geographical locations, such as in Europe, FM stations can only be transmitted at frequencies up to 75 kHz. Thus, different portions of the FM baseband may be available on any station depending on baseband bandwidth restrictions or the presence of other subcarrier signals.

Various issued patents and pending applications including U.S. Pat. Nos. 4,713,808 and 4,897,835 (both by Gaskill), U.S. Pat. No. 5,187,470 (King) and application Ser. No. 08/046,112, filed Apr. 9, 1993 show systems where digital data is transmitted on a FM subcarrier 16 modulated on the FM baseband shown in FIG. 1. Subcarrier 16 has a center frequency at 66.5 kHz and a bandwidth that extends from approximately 57 kHz to 75 kHz.

SUMMARY OF THE INVENTION

In a system which operates with subcarrier channels of a given bandwidth, the invention significantly increases the amount of payload data that can be transmitted. Two separate subcarrier channels are utilized. The amount of payload data transmitted utilizing the invention is more than twice the amount which can be transmitted utilizing one subcarrier channel. The timing and synchronization information utilized by the first channel can include information such as bit synchronization information, packet synchronization (i.e. flags), slot and frame synchronization information.

The second channel does not need to transmit this same information. Instead, at the modulator, the transmission of the bit stream in the second channel is synchronized to the transmission of the bit stream in the first channel. Thus, at the receiver, the timing and synchronization information extracted from the first channel can be used to accomplish the timing and synchronization of information in the second channel. Furthermore, utilizing this invention the data decoder for the secondary channel can be simplified by utilizing resources which are utilized for decoding the first channel.

This invention is particularly useful in a system designed to (a) operate on a large number of stations some of which have subcarrier channels used for other purposes and (b) which is designed to transmit information to receivers that can receive signals on either one or two channels each or which is located at a particular region of the subcarrier. In such a system, in a situation where one of the channels is used for an unrelated purpose, information can be transmitted on the signal channel which is available. The transmission capacity of the system will be decreased; since all of the information will have to be transmitted in one channel instead of two; however, by providing two relatively narrow channels rather than a single wide channel, the system achieves significant advantages in diversity. With the present invention, which makes the sum of information transmitted on two narrow channels more than would be expected by utilizing two independent channels of similar width, a two channel system becomes particularly advantageous.

The foregoing and other objects, features and advantages of the invention will become more readily apparent from the following detailed description of a preferred embodiment of the invention which proceeds with reference to the accompanying drawings.

DETAILED DESCRIPTION

Figure 1:
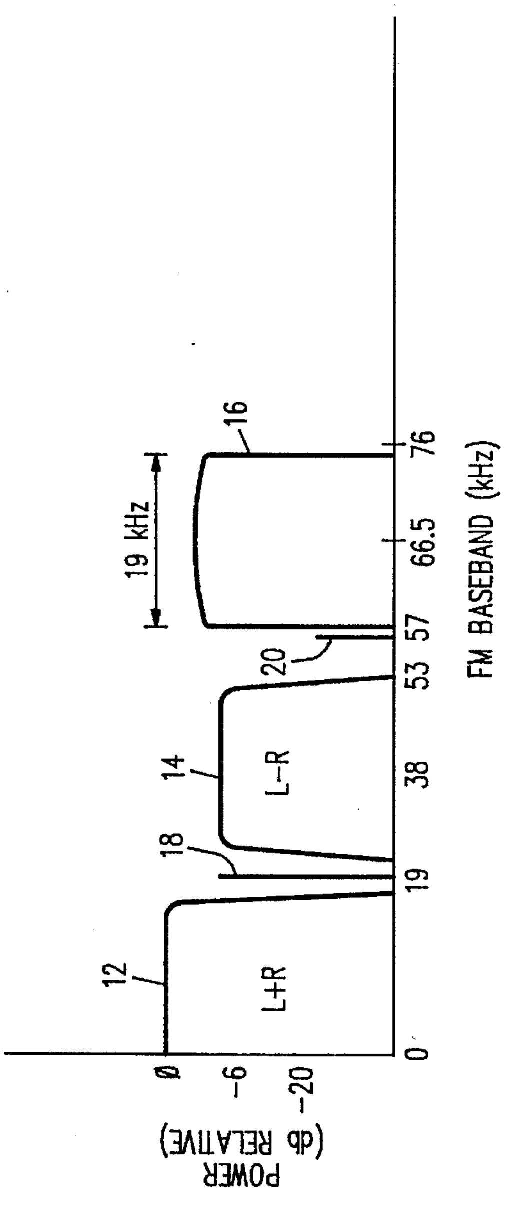
PRIOR ART FIG. 1
FIG. 1 is a prior art diagram of the baseband spectrum of a typical FM broadcast station including a first subcarrier for transmitting digital paging data.

The present invention is designed to operate within the baseband spectrum of a typical FM broadcast station as previously shown in FIG. 1. The specific format of the transmitted messages and the hardware used for transmitting and receiving the messages as discussed below are described in detail in U.S. Pat. No. 4,713,808 to Gaskill which is herein incorporated by reference.

Figure 2:
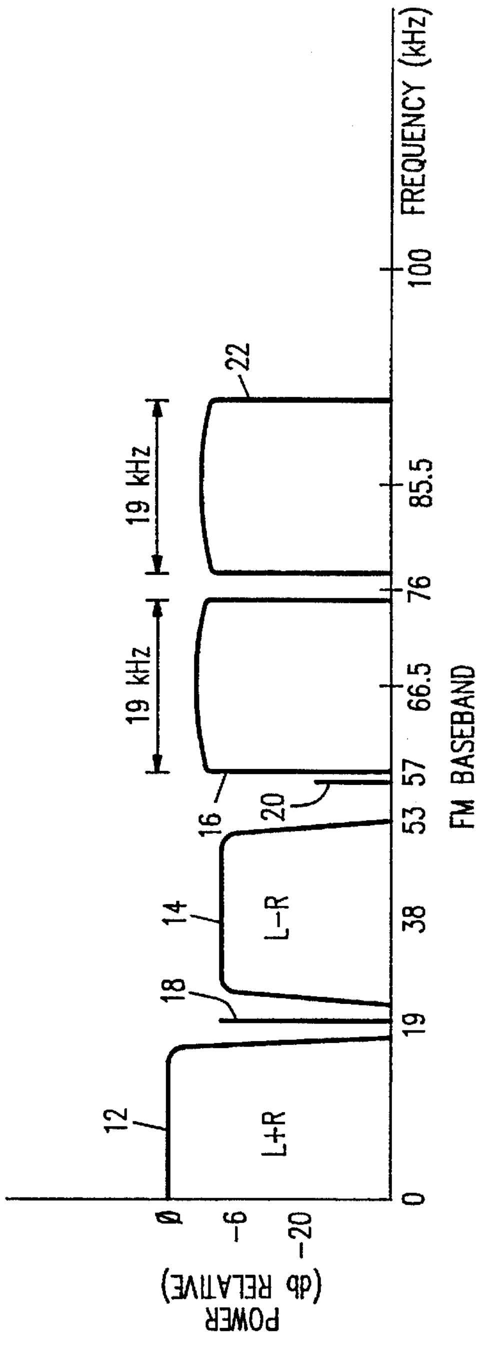
FIG. 2 is a diagram of the FM baseband shown in FIG. 1 including an additional synchronized subcarrier signal according to the invention.

Referring to FIG. 2, subcarrier 16 contains a time division multiplexed (TDM) digital message that is transmitted to a specific target receiver. A second subcarrier 22 is transmitted in conjunction with the first subcarrier 16 to increase the overall frequency bandwidth available for transmitting raw message data. In one embodiment, data in subcarrier 16 is transmitted to a one-way wireless pager receiver. However, the invention can be utilized in any system used to transmit wireless digital information.

The FM baseband in FIG. 2 includes an existing 57 kHz subcarrier 20 which exists on some FM stations. As explained above, some FM transmission frequencies cannot exceed 75 kHz. Thus, subcarrier 16 is located between the upper limit of the audio programming and the common baseband frequency limit of 75 kHz. Subcarrier 16 has a center frequency at 66.5 kHz.

The second subcarrier 22 is located somewhere between 75 kHz and the 100 kHz upper frequency limit for FM transmissions. The center frequency of subcarrier 22 is typically located at 85.5 kHz but could vary according to available baseband frequencies. In general, subcarriers 16 and 22 have the same bandwidth which is equal to the frequency of the FM stereo pilot frequency 18 (i.e., 19 kHz). Further, the center frequencies of each subcarrier are selected, if possible, at some multiple of the stereo pilot frequency (e.g., 3.5 or 4.5).

Subcarrier 22 is then transmitted in synchrony to subcarrier 16. Thus, after the portion of the message transmitted in subcarrier 16 is located by the receiver, remaining portions of the message located in the second subcarrier are also known. Therefore, bandwidth overhead required to synchronize the first subcarrier message with the receiver is not required in the portion of the message transmitted in the second subcarrier. Additionally, reduced synchronization hardware is required for the second subcarrier.

The second subcarrier 22 doubles the amount of the FM baseband spectrum used by the digital transmission system. However, all synchronization and addressing overhead is located in subcarrier 16. Therefore, subcarrier 22 more than doubles the amount of bandwidth available for transmitting raw message data while only using twice as much of the FM baseband.

For example, in one embodiment, the first subcarrier 16 carries 260 bits of data per packet. However, only approximately 240 packets contain raw message data. Out of these 240 packets, there is time slot information, format data, error checking data, etc. After subtracting out this overhead data, only approximately 75% of the bandwidth of subcarrier 16 is used for transmitting raw message data. Alternatively, almost 100% of the bandwidth of the second subcarrier can be used for transmitting raw message data.

Figure 3:
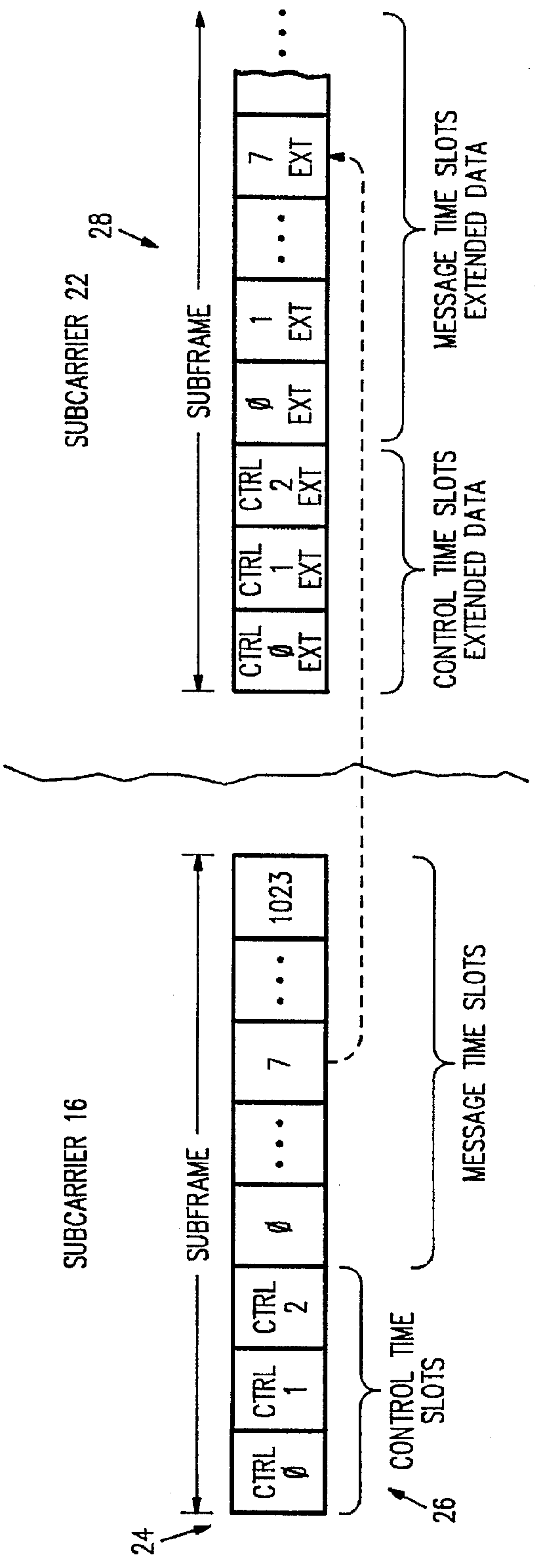
FIG. 3 is a diagram showing the format for control and message data transmitted by the system in FIG. 2.

To explain further, FIG. 3 shows one format for transmitting digital data. Subcarrier 16 carries a master frame containing multiple subframes similar to subframe 24. Subcarrier 22 carries additional extended data in subframes similar to subframe 28. The first three time slots 26 in subframe 24 contain control data used for master frame synchronization, time of day, station identification, etc. Subsequent message time slots 0 through 1023 contain data packets which each contain, data addresses, format fields, error correction bits, etc. Subcarrier 22 also carries multiple subframes similar to subframe 28. The first few time slots in subframe 28 are control time slots for the extended data. Each subframe in subcarrier 22 also includes message time slots that only carry additional extended data. The format of the master frame, subframes and message time slots are described in Gaskill and are, therefore, not explained in detail.

The second subcarrier 22 carries an additional 260 bits for each data packet from the first subcarrier. Thus, any packet read from the first subcarrier is "followed" synchronously with 260 bits on the second subcarrier. One major advantage of transmitting two subcarriers is that all synchronization receiver identification, message identification, format, error correction codes, and cyclic redundancy checks, etc., are identified in the data on the first subcarrier 16.

For example, message time slot 7 in subframe 24 tells the receiver that an additional portion of the message is located in either subframe 24 or 28. The remaining times slots in subframe 28 are message time slots containing data. Thus, message time slot 7 in subframe 24 directs the receiver to message time slot 7 in subframe 28. The receiver then reads the remaining portion of the extended data contained in subframe 28.

By the time the initial portion of the message in time slot 7 is read, the receiver has already synchronized with the data transmitted in subcarrier 16. As a result, bits used in the message time slots of subframe 24 to identify the correct target receiver are not needed in the message time slots transmitted in subframe 28. Thus, substantially more of the bits in the extended data packets located in subframe 28 are available for storing raw data.

Figure 4:
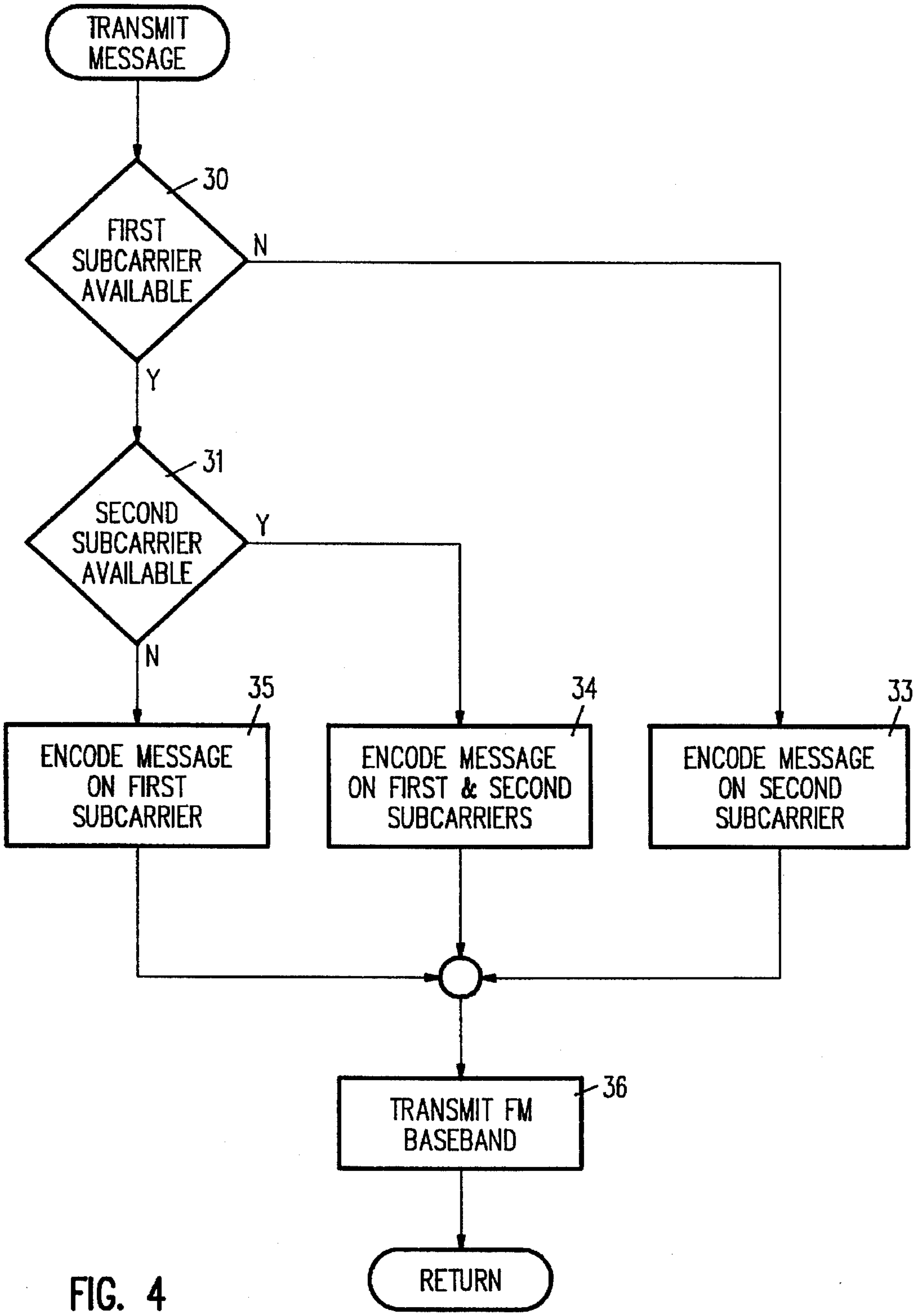
FIG. 4 is a block diagram showing a method for transmitting digital messages over dual subcarriers according to the invention.

FIG. 4 shows a method for transmitting digital messages on multiple subcarriers. Decision block 30 determines whether a first subcarrier is available for transmission on the FM baseband. If the first subcarrier is available, decision block 31 then determines whether a second subcarrier is also available for transmission on the FM baseband. A second subcarrier cannot be transmitted in some locations. In this situation, block 35 encodes data into a master frame only on the first subcarrier 16 (FIG. 1). Block 36 then transmits only the first subcarrier on the FM baseband.

When a second subcarrier 22 is also available for FM transmission in addition to the first subcarrier, decision block 31 jumps to block 34. Block 34 encodes the message data into subframes transmitted on multiple subcarriers. Block 36 then transmits the message on both subcarriers 16 and 22 (FIG. 2) on the FM baseband.

Referring back to decision block 30, a situation may occur where the first subcarrier is not available for transmission on the FM baseband. Accordingly, block 33 encodes the entire message on the second subcarrier. The message is then transmitted on the FM baseband in the second subcarrier 22 block 36.

The proportions of the message transmitted on the first and second subcarriers depend on the number of other messages being transmitted to other receivers and on the length of the message. For example, during times of low utilization, a larger proportion of the message may be transmitted on the first subcarrier. However, during high traffic conditions, higher proportions of a message may be transmitted on the second subcarrier.

The dual subcarriers can also transmit messages to multiple receivers. For example, the dual subcarriers could be used to transmit stock market reports, scores of sporting events, etc. to multiple paging receivers at the same time.

Figure 5:
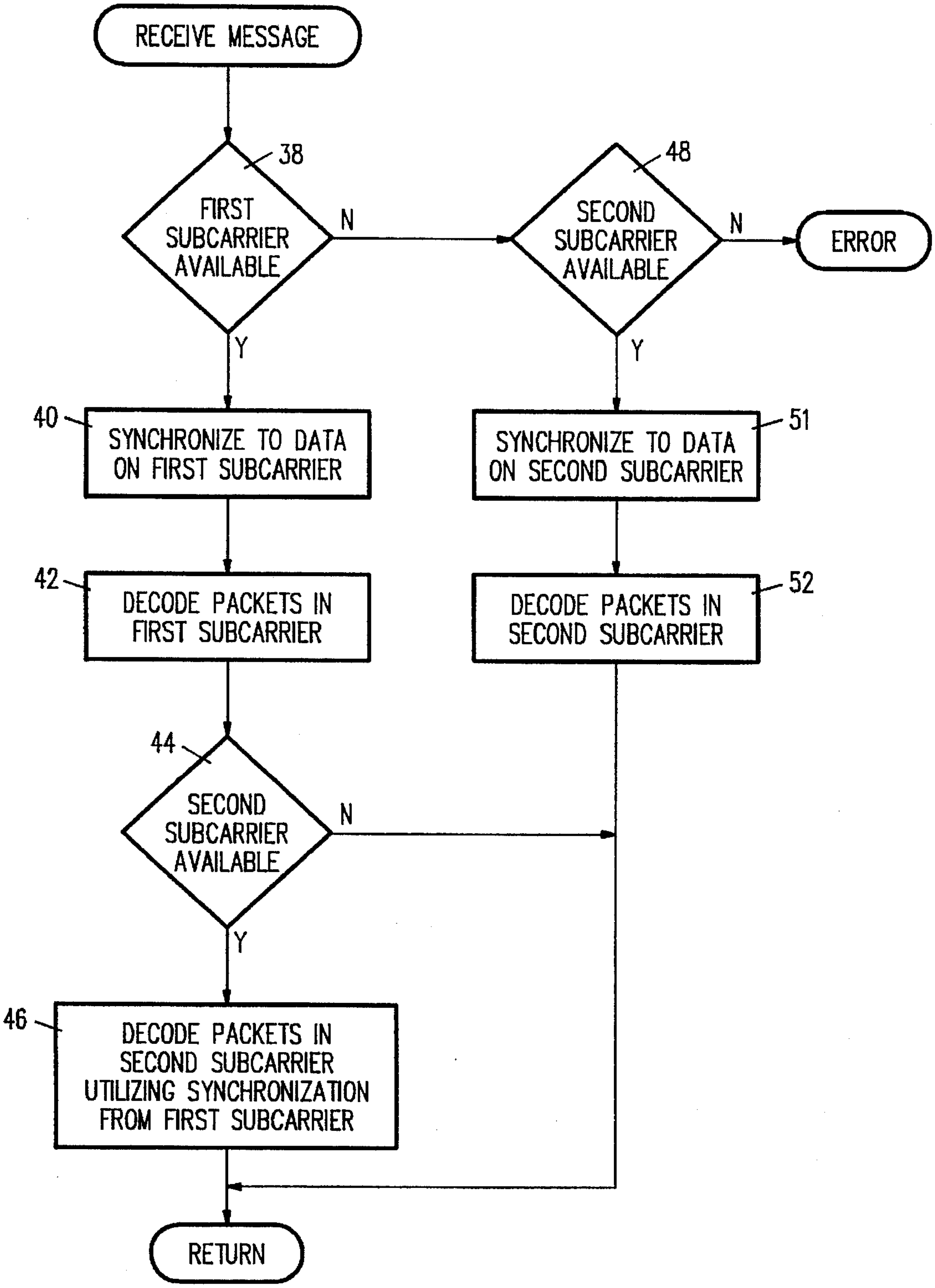
FIG. 5 is a block diagram showing a method for receiving digital messages over dual subcarriers according to the invention.

FIG. 5 shows the method for receiving a digital message over multiple subcarriers in an FM baseband. Block 38 first determines whether a first subcarrier is available. If the first subcarrier is available, block 40 synchronizes the receiver to data on the first subcarrier and block 42 then decodes data packets in the first subcarrier.

Decision block 44 determines whether a second subcarrier is available for transmitting data. If the second subcarrier is not available, the receiver returns for receiving the next data transmission. If decision block 44 determines that the second subcarrier is available, block 46 decodes packets in the second subcarrier utilizing synchronization from the first subcarrier.

Referring back to decision block 38, if the first subcarrier is not available, decision block 48 then determines if the second subcarrier is available. If neither the first or second subcarrier are available, decision block 48 generates an error message. If the second subcarrier is available, the receiver in block 51 synchronizes to the data in the second subcarrier.

Block 52 then decodes packets in the second subcarrier and then returns for receiving the next message.

Figure 6:
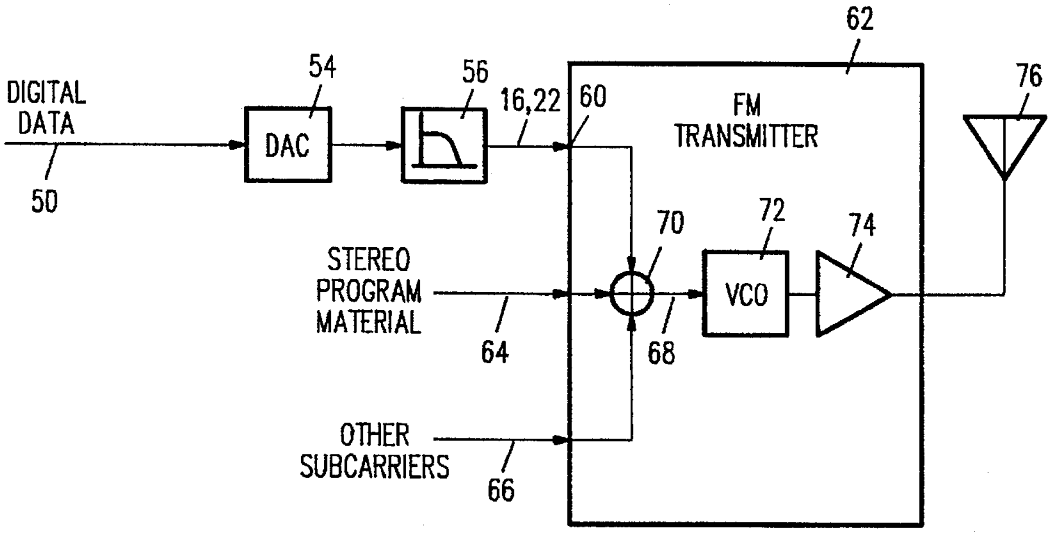
FIG. 6 is a block diagram of the transmission system used for transmitting the FM baseband shown in FIG. 2.
Figure 7:
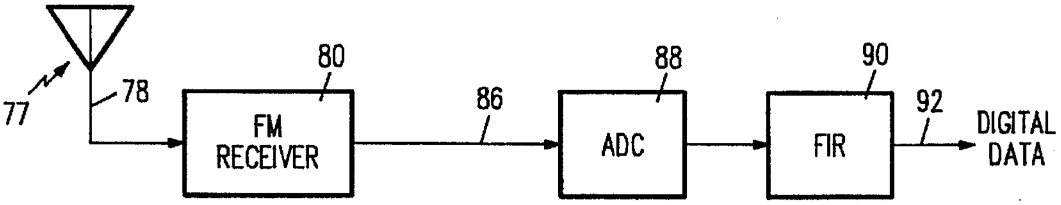
FIG. 7 is a block diagram of the receiver system used for receiving messages over multiple subcarriers.

A system of the general type shown in FIGS. 6 and 7, is utilized to generate the FM baseband spectrum shown in FIG. 2. The transmission system shown in FIG. 6 includes a digital data signal 50 that is passed through a digital to analog converter (DAC) 54. The analog signal is then passed through a set of filters 56 creating the first and second analog subcarrier signals 16 and 22, respectively (FIG. 2). Subcarrier signal 16 and 22 are then applied to the subcarrier input port 60 of a broadcast FM transmitter 62.

As is conventional, transmitter 62 includes a summation circuit 70, a voltage controlled oscillator 72 and an amplifier 74. Radio frequency energy from the FM transmitter 62 is then broadcasted as FM radio waves by an antenna 76. Contained within the transmitter 62 is the baseband signal 68 which consists of the summation of the subcarriers 16 and 22, the stereo program material 64, and any other subcarriers that may be present 66. Such transmitters and antennas are commercially available.

The receiver system shown in FIG. 7 includes an antenna 77 for converting radio waves into electrical signals which are then amplified and demodulated by a conventional or unconventional FM receiver 80. The FM receiver is capable of tuning over the range of the international FM broadcast bands. The output 86 of receiver 80, consists of the summation of the baseband signal 68 of the FM broadcast station.

The baseband signal is then digitized by an analog to digital converter 88. After digitization, the signal is applied to one or more filters 90 which have appropriate passbands so as to produce the desired digital data from subcarriers 16 and 22 on its output 92. The details of the functional blocks in the transmitter and receiver are understood by one skilled in the art and are, therefore, not described in detail.

Because the two subcarriers are modulated in essentially the same manner, most of the decode circuitry in the receiver is the same. For example, as previously shown in FIG. 2, the first subcarrier has a center frequency of 66.5 kHz which is 3.5 times the FM pilot frequency (19 kHz). The second subcarrier has a center frequency of 85.5 kHz which is 4.5 times the FM pilot frequency. The second subcarrier can be passed through the same filter 90 (using different coefficients in the filter) and then combined with the digital data from the first subcarrier. Thus, common circuitry can be used to perform the analog to digital conversion, clock extraction, filtering, and data decoding for both subcarriers. The design of an appropriate filter 90 in copending application Ser. No. 07/863313 filed Mar. 27, 1992 entitled: "Digital Filter and Method of Design" which is assigned to assignee of present invention.

The reduction in hardware is especially advantageous for receivers with space constraints and portable power supplies. For example, the redundancy in circuitry for a dual subcarrier receiver allows the data payload to increase by more than a factor of two while using essentially the same hardware. Because the receiver hardware doesn't have to operate at a higher speed or power more circuitry, the receiver power supply can operate for longer periods of time.

By transmitting multiple subcarriers, the receiver also processes data in a more efficient manner. For example, to conserve energy, a paging system polls at predetermined times to determine if a message is being transmitted. Thus, a large amount of time and energy is spent simply trying to identify messages.

After the receiver successfully identifies a message, the receiver can be quickly and efficiently directed to additional portions of the message contained in either the first or second subcarrier. For example, as described above, the receiver is directed by an address to additional time slots containing portions of a message. The present invention allows the receiver to activate only for those time slots containing additional portions of the message. Thus, minimal additional energy is required to read large portions of a message located in the second subcarrier Therefore, the system described above substantially increases the available bandwidth of wireless digital data transmissions with minimal changes in existing hardware. Further, multiple subcarriers can be transmitted without changing present digital data transmission formats.

Because one or more subcarriers are capable of transmitting data, the system also has the advantage of being more adaptable to various subcarrier arrangements in the baseband frequency spectrum. For example, if a first subcarrier is already allocated to another system, a message can be sent on one of the alternative subcarriers. Alternatively, if each subcarrier is available, larger messages can be sent in a shorter amount of time.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A radio paging system wherein paging messages are transmitted from an FM transmitter to paging receivers via signals carried on an FM baseband radio signal, comprising:

a first subcarrier containing both a first portion of the message and control data, the control data identifying the message with a given paging receiver; and a second subcarrier containing a second portion of said message directed to the given paging receiver, the second portion of the message identified by the paging receiver according to the control data in the first subcarrier thereby increasing the proportion of message data transmitted in the second subcarrier.

2. A radio paging system according to claim 1 wherein the first and second subcarriers have substantially the same bandwidth.

3. A radio paging system according to claim 1 wherein each paging receiver includes a single circuit for decoding both the first and second subcarriers into digital data.

4. A radio paging system according to claim 1 wherein the first and second portions of the message are located in associated message time slots and the paging receiver is intermittently activated in synchronization with the associated message time slots.

5. A radio paging system wherein paging messages are transmitted from an FM transmitter to paging receivers via signals carried on an FM baseband radio signal, comprising:

a first subcarrier containing both a first portion of the message and control data, the control data identifying the message with a given paging receiver;

a second subcarrier containing a second portion of said message directed to the given paging receiver, the second portion of the message identified by the paging receiver according to the control data in the first subcarrier thereby increasing the proportion of message data transmitted in the second subcarrier; and wherein the FM baseband signal includes a stereo pilot frequency and the first subcarrier includes a frequency bandwidth substantially equal to the stereo pilot frequency.

6. A method for transmitting information from an FM transmitter to at least one receiver, comprising:

transmitting a first subcarrier on an FM radio baseband containing control data that identifies a target receiver for receiving a digital data and a first portion of the digital data;

transmitting a second subcarrier on the FM radio baseband, the second subcarrier containing at least a second portion of the digital data; and reading the digital data in the second subcarrier with the identified target receiver according to the control data in the first subcarrier.

7. A method according to claim 6 wherein the first subcarrier includes an additional portion of the data contained in the second subcarrier.

8. A method according to claim 7 wherein the data and control data are transmitted in a time division multiplexed format during multiple time slots.

9. A method according to claim 8 including intermittently activating the receiver during the time slots containing the portions of the data contained in the first and second subcarriers.

10. A method according to claim 8 wherein the baseband signal includes a stereo pilot frequency and including synchronizing the receiver to the time slots containing the data according to the pilot frequency.

11. A method for transmitting information from an FM transmitter to at least one receiver, comprising:

transmitting a first subcarrier on an FM radio baseband containing control data that identifies a target receiver for receiving a digital data;

transmitting a second subcarrier on the FM radio baseband, the second subcarrier containing at least a portion of the digital data;

reading the digital data in the second subcarrier with the identified target receiver according to the control data in the first subcarrier;

wherein the first subcarrier includes an additional portion of the data contained in the second subcarrier;

wherein the data and control data are transmitted in a time division multiplexed format during multiple time slots;

said method including intermittently activating the receiver during the time slots containing the portions of the data contained in the first and second subcarriers;

wherein the baseband signal includes stereo program material, a stereo pilot frequency, a third subcarrier, a first FM transmission limit and a second FM transmission limit and including the following steps:

transmitting the first subcarrier between the third subcarrier and the first FM transmission limit; and transmitting the second subcarrier between the first FM transmission limit and the second FM transmission limit.

12. A method according to claim 11 wherein the first FM transmission limit is approximately 75 kHz and the second FM transmission limited is approximately 100 kHz.

13. A method according to claim 12 wherein the first subcarrier and second subcarrier have equal bandwidths.

14. A method according to claim 13 wherein the data located in the first and second subcarriers is transmitted to multiple receivers at the same time.

15. A method for transmitting digital time division multiplexed messages from an FM transmitter to a receiver via signals carried on an FM radio signal, comprising:

transmitting a first subcarrier on the FM radio signal, the first subcarrier including a time division multiplexed data stream having a first set of data packets positioned at different temporal locations, the data packets containing both message data containing at least a portion of a message and control data for identifying an associated receiver for receiving the message and identifying the temporal locations of the data packets; and transmitting a second subcarrier having a second set of data packets containing a second portion of the message, the control data from the first subcarrier identifying the locations of the second set of data packets to the identified receiver.

16. A method according to claim 15 wherein the control data in the first subcarrier includes an address indicating the temporal distance in the data stream between the first and second set of data packets.

17. A method according to claim 15 wherein the bandwidth of the first and second subcarriers are equal.

18. A method according to claim 15 wherein the FM radio signal includes a stereo pilot frequency and including extracting a receiver clock signal directly from said stereo pilot frequency.

19. A method for transmitting digital time division multiplexed messages from an FM transmitter to a receiver via signals carried on an FM radio signal, comprising:

transmitting a first subcarrier on the FM radio signal, the first subcarrier including a time division multiplexed data stream having a first set of data packets positioned at different temporal locations, the data packets containing both message data containing at least a portion of a message and control data for identifying an associated receiver for receiving the message and identifying the temporal locations of the data packets;

transmitting a second subcarrier having a second set of data packets containing a second portion of the message, the control data from the first subcarrier identifying the locations of the second set of data packets to the identified receiver; and said method including transmitting multiple subcarriers in excess of two, each subcarrier containing a portion of the message.

* * * * *